United States Patent [19]

Wiggenhorn

[11] Patent Number: 5,612,846
[45] Date of Patent: Mar. 18, 1997

[54] ELECTRICAL CONNECTOR INTERFACE

[75] Inventor: James T. Wiggenhorn, Coral Springs, Fla.

[73] Assignee: Motorola, Inc., Schaumburg, Ill.

[21] Appl. No.: 236,825

[22] Filed: May 2, 1994

[51] Int. Cl.[6] .................................................. H02H 9/04
[52] U.S. Cl. ........................................ 361/56; 361/111
[58] Field of Search ............................. 361/56, 111, 91; 439/620

[56] References Cited

U.S. PATENT DOCUMENTS

| | | | |
|---|---|---|---|
| 4,729,752 | 3/1988 | Dawson, Jr. et al. | 361/56 |
| 5,008,770 | 4/1991 | Hilland | 361/56 |
| 5,181,864 | 1/1993 | Wakino et al. | 361/119 |
| 5,213,522 | 5/1993 | Kojima | 439/620 |
| 5,213,524 | 5/1993 | Okamoto et al. | 439/620 |
| 5,236,376 | 8/1993 | Cohen | 439/620 |
| 5,256,085 | 10/1993 | Tan et al. | 439/607 |

OTHER PUBLICATIONS

Data Handbook, pp. 341–361, Philips Components, International Business Relations, The Netherlands, 1989.

*Primary Examiner*—Todd DeBoer
*Attorney, Agent, or Firm*—Andrew S. Fuller

[57] ABSTRACT

An electrical connector interface (10) provides for voltage surge protection. The connector interface (10) includes electrical interface conductors (12), an electrical ground conductor (14), and a selectively conductive material (18). The ground conductor (14) is spaced apart from the electrical interface conductors (12), and the selectively conductive material (18) is electrically coupled to the electrical interface conductors (12) and to the electrical ground conductor (14). The selectively conductive material (18) has low electrical conductivity within a predetermined voltage range, and has high electrical conductivity outside the predetermined voltage range.

2 Claims, 4 Drawing Sheets

50

60

5,612,846

ELECTRICAL CONNECTOR INTERFACE

Technical Field

This invention relates in general to electrical connector interfaces, and more particular, to electrical connector interfaces for electronic devices.

Background of the Invention

Many electronic devices include electrical interfaces to support external accessories. The electrical interface provides access to the internal functions of the electronic device. In a typical application, a two-way radio has an electrical interface in the form of an accessory connector port accessible through an opening within the radio housing. The connector port includes multiple electrical contacts which are externally accessible for mating with an accessory connector. Generally, some of the electrical contacts are electrically coupled via signal lines to internal electronic components of the electronic device. Some of these electronic components may be particularly susceptible to damage from electrostatic energy conducted through the connector port. Preferably, electrostatic protection is included in such devices to prevent damage to the vulnerable components.

Traditionally, electrostatic protection is implemented using discrete components attached to the signal lines coupling the electrical contacts to the components. Such discrete components include resistors, capacitors, Zener diodes, and the like. For example, in a typical prior art device, a Zener diode may physically connect, though not electrically connect, a signal line to an electrical ground. At normal operating voltages, there is no electrical coupling between the signal line and the electrical ground. However, a voltage on the signal line exceeding a certain threshold, such as may be caused by an electrostatic discharge, causes the signal line to be shunted to ground, thereby protecting the coupled components from the high voltage signal. Other signal lines needing protection would be configured similarly, thus requiring additional discrete protective components. The use of multiple discrete components to provide electrostatic protection for individual lines increases the total number of components within the electronic device which generally result in an increase in component costs and manufacturing costs. Moreover, space is consumed by these discrete protection devices and thus is unavailable for other components.

There exists a need to provide protection for internal electronic components of electronic devices from damage caused by electrostatic energy conducted through electrical connector interfaces. Preferably, such protection must be provided in a space efficient manner without significantly increasing the manufacturing costs for the electronic device.

Detailed Description of the Preferred Embodiment

Generally, an electrical connector interface is provided for an electronic device. The connector interface includes an integral high voltage transient and surge protection portion to protect the internal components of the electronic device from damage caused by electrostatic and electromagnetic energy surges. The inclusion of the integral surge protection portion obviates the need to have separate discrete components associated with each signal line electrically coupling electrical contacts on the connector interface to other portions of the electronic device.

Figure 1:
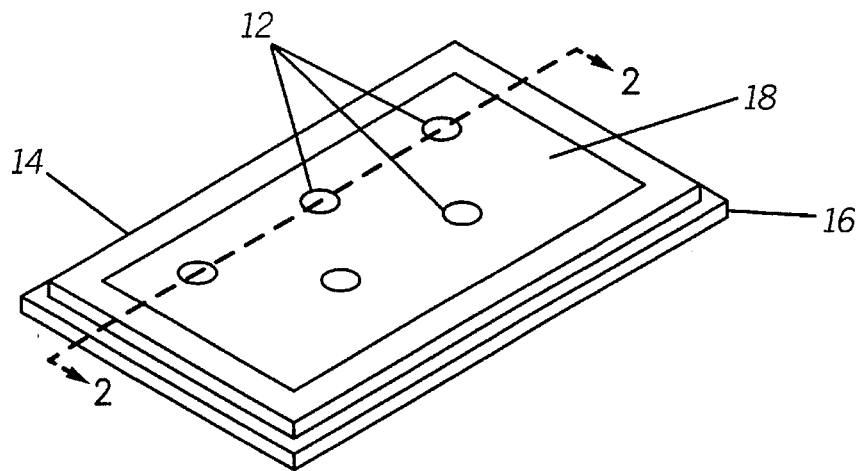
FIG. 1 is a perspective view of an electrical connector interface, in accordance with the present invention.
Figure 2:
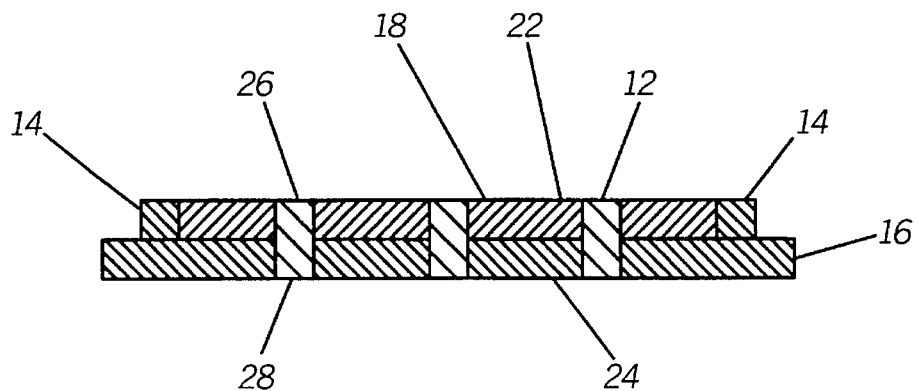
FIG. 2 is a cross-sectional view of the electrical connector interface of FIG. 1.

FIG. 1 is a perspective view of an electrical connector interface 10 in accordance with the present invention. FIG. 2 is a cross-sectional view of the electrical connector interface 10 along the line 2—2 of FIG. 1. Referring to FIGS. 1 and 2, the connector interface 10 includes a frame structure 16, an array of electrical interface conductors 12, a selectively conductive material 18, and an electrical ground conductor 14. In the preferred embodiment, the connector interface 10 is formed into a rectangular structure having a front or interface portion, and a rear portion 24 for electrical connections to a host device. The frame structure 16 is preferably formed from a rigid, electrically non-conductive or insulating material, such as plastic and the like. The frame structure 16 provides structural support for the interface conductors 12, the ground conductor 14, and the selectively conductive material 18.

The ground conductor 14 is formed from copper or other conductive material. In the preferred embodiment, the ground conductor 14 extends around the periphery as in a conductive metal ring. Preferably, the ground conductor 14 is in close proximity to, but spaced apart and electrically separated from, the electrical interface conductors 12 by the selectively conductive material 18. The interface conductors 12 are formed from electrical conductive material such as copper, brass, beryllium copper, and the like. The interface conductors 12 extend through the body of the connector interface 10 and are securely housed within the frame structure 16. Each interface conductor 12 has two opposing ends 26, 28. One end 26 forms an electrical contact toward the front portion of the connector interface 10, and the other end 28 provides an electrical connection port for a signal line toward the rear portion 24 of the connector interface 10. The electrical contact portion 26 of the conductors 12 provide an interface for corresponding electrical contacts from a mating connector. Although the electrical contact portions 26 are illustrated as contact surfaces, the electrical contact portions 26 could be formed into connector pins or other configurations as needed. Ordinarily, the electrical contacts are electrically isolated from each other, and from the conductive ring 14, by the insulating frame structure 16 and the selectively conductive material 18. However, particular applications may require that a conductive path be permanently or selectively established between two or more conductors 12. Additionally, the presence of a high voltage across one of the conductors 12 and the conductive ring 14 may result in conductivity between that conductor and the conductive ring 14, as will be described in more detail below.

Figure 3:
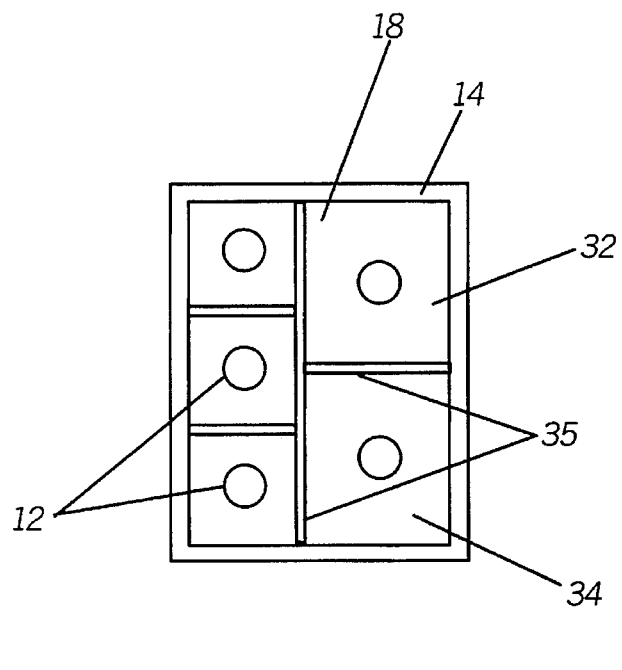
FIG. 3 is plan view of a second embodiment of the connector interface, in accordance with the present invention.

FIG. 3 shows a second embodiment of the connector interface 10 in which the electrical interface conductors 12 are further electrically separated by electrical insulators in the form of insulative strips 35 disposed within the selectively conductive material 18. The insulative strips 35 allow independent configuration of the relationship between each interface conductor 12 and the conductive ring 14. For example, in the second embodiment, the composition of the selectively conductive material 18 in each segment 32, 34 varies depending on the protection needs at each electrical interface conductor 12.

Figure 4:
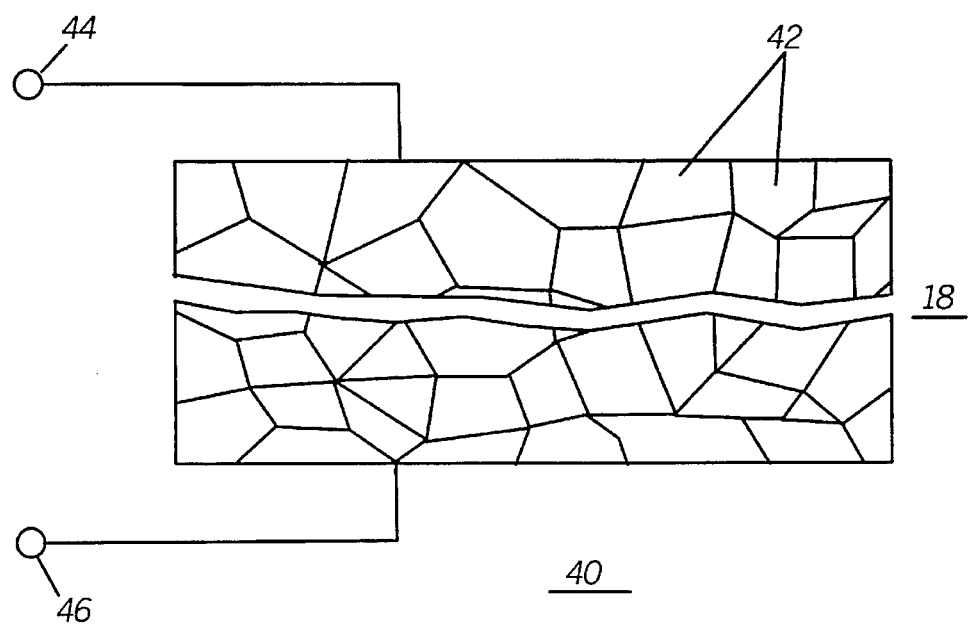
FIG. 4 is a structural representation of a selectively conductive material.
Figure 5:
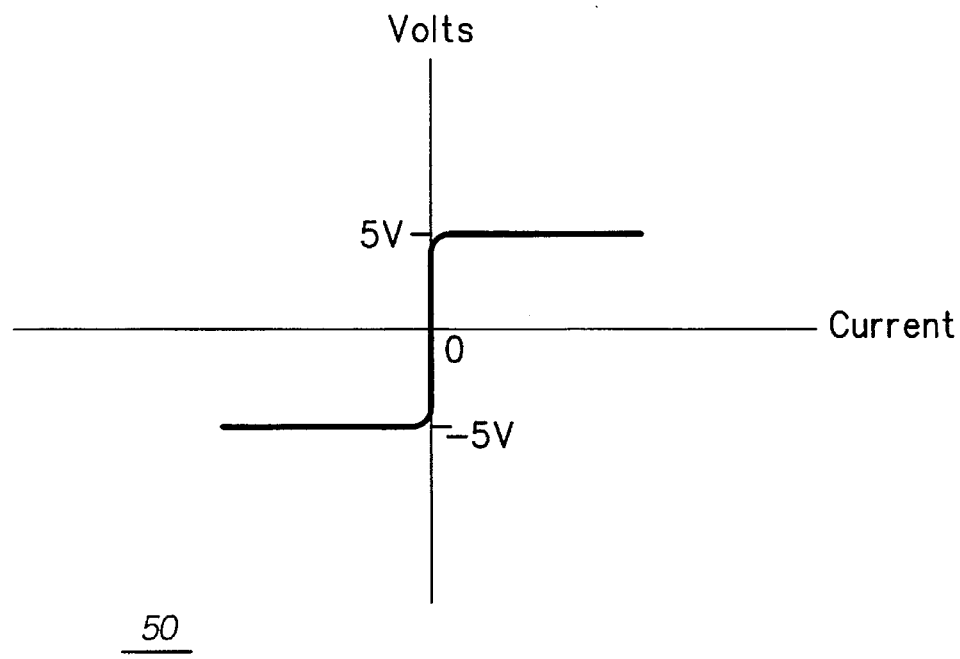
FIG. 5 is a graph showing voltage versus current behavior of the selectively conductive material.

As illustrated in FIGS. 2 and 3, the selectively conductive material 18 is disposed about, and is in electrical contact with, the electrical interface conductors 12. The selectively conductive material 18 has low or negligible electrical conductivity (high electrical resistance) within a predetermined voltage range, and high electrical conductivity (low electrical resistance) outside the voltage range. Materials having such properties include metal oxide based materials such as materials comprising zinc oxide. In the preferred embodiment, the selectively conductive material 18 comprises zinc oxide formed into a crystalline structure to have specific voltage limiting characteristics. The zinc oxide base is milled, granulated, pressed, and sized to have voltage-dependent nonlinear resistance specific to a desired application. FIG. 4 illustrates the resultant structure 40 of the zinc oxide base material. The orientation of the granular particles 42 help determine the voltage rating and current capability of the material. When a voltage exceeding the voltage rating is applied across the selectively conductive material 18, as between ports 44 and 46, the material becomes conductive. FIG. 5 further illustrates the selective conductivity of the material using a voltage-ampere graph 50. In this example, the selectively conductive material 18 has a voltage range of between plus and minus five volts. Similarly formed materials are used in varistors available from manufacturers such as Phillips Corporation, General Electric Corporation, and Siemens Corporation.

Figure 6:
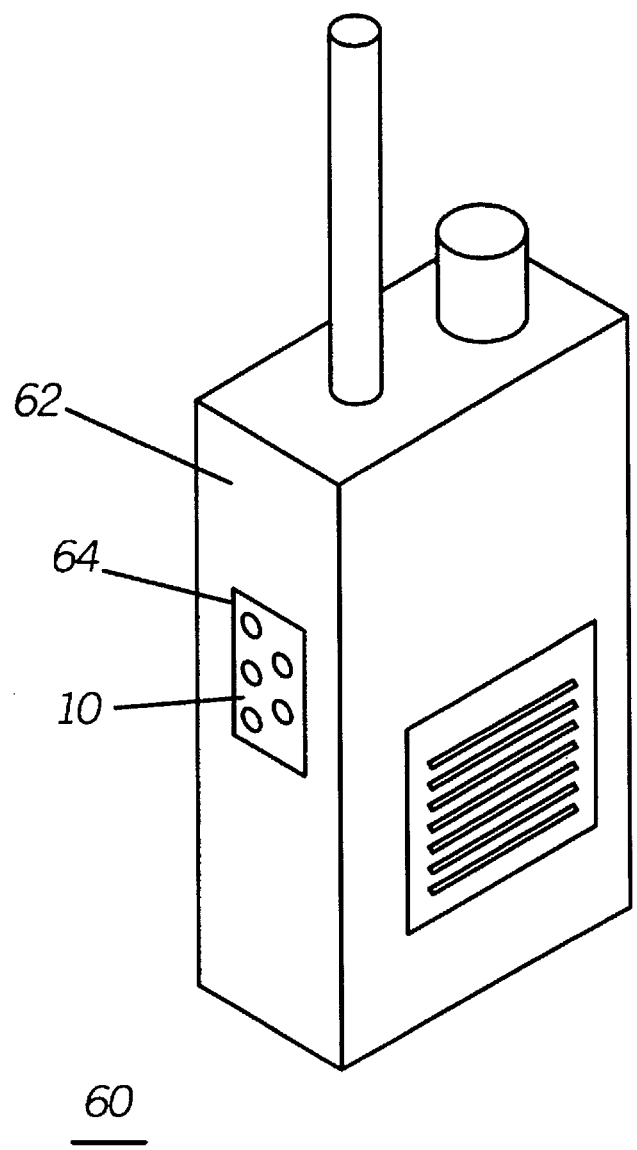
FIG. 6 is a radio in accordance with the present invention.

Referring to FIG. 6, an electronic device 60 is shown in accordance with the present invention. The electronic device 60 is a portable two-way radio which includes communication circuitry (not shown) for communicating over radio frequency channel. The radio 60 includes a radio housing 62 having an opening 64 therein, and the electrical connector interface 10. The connector interface 10 is mounted to the radio housing 62 and exposed through the opening 64 to form a radio accessory connector interface accessible to an external connector (not shown). As the connector interface 10 is exposed, it is susceptible to the application of high voltage energy Such as from an electrostatic discharge transmitted through the body of an operator, or through an attached connector. The voltage surge protection integrated into the connector interface 10 prevents potential damage to the internal components of the radio 60.

Figure 7:
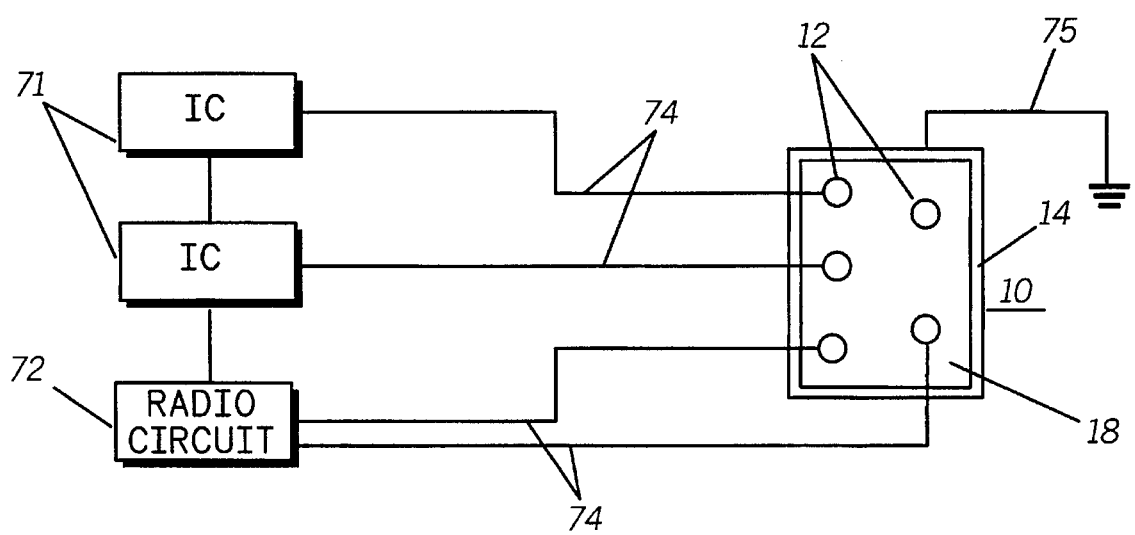
FIG. 7 is a simplified electrical block diagram of the radio of FIG. 6.

FIG. 7 shows a simplified electrical block diagram to illustrate the electrical coupling between the electrical connector interface 10 and the other circuitry of the radio 60. The radio has electronic components which are susceptible to damage from high voltage transients or surges. Preferably, the conductive ring 14 is electrically coupled to electrical ground via a ground connection 75. Multiple signal lines 74 electrical couple the interface conductors 12 of the connector interface 10 to electronic components such as integrated circuits 71 and other portions of the radio circuit 72. Ordinarily, signals within the operating voltage of the radio 60, for example signals at or below 5 volts, are conducted by the connector interface 10 unimpeded by the high voltage protection scheme. However, signals at a voltage exceeding 5 volts are shunted to electrical ground. Without voltage surge protection, high voltage energy may be conducted through the connector interface 10 along the signal lines to the electronic components to adversely affect or severely damage the components. The selectively conductive material 18 operates in combination with the electrically grounded conductive ring 14 to provide protection from such occurrences. In particular, upon the existence of a high voltage differential between a conductor 12 and the electrically grounded conductive ring 14, the selectively conductive material 18, being electrically coupled to the interface conductors 12, becomes electrically conductive and the high voltage energy converted to current flows through the conductive ring 14 to electrical ground. Thus, protection is afforded to electronic components 71, 72 electrically coupled to the connector by diverting high voltage signals entering the connector interface 10.

The present invention offers significant advantages over other solutions found in prior art devices. Many prior art devices include discrete components, such as metal oxide varsities, diodes, and the like, attached to each signal line for protection. Thus, development and manufacturing costs are incurred as these components are integrated into the electronic device. In the present invention, the high voltage surge protection is built directly into the connector interface 10, thus avoiding the costs of multiple discrete components. In the preferred embodiment, the electrical ground conductor 14 is electrically isolated from the electrical interface conductors 12 by the selectively conductive material 18 unless a voltage exceeding a predetermined threshold is applied across the electrical ground conductor 14 and one of the electrical interface conductors 12. The integration of surge protection within the connector interface 10 results in a reduction of the number of components needed in a product. A reduction in the number of parts used typically results in a corresponding reduction in overall manufacturing cost for the product. Similarly, there is a reduction in the number of opportunities for manufacturing defects which normally leads to a higher quality product.

What is claimed is:

1. An electrical connector interface for an electronic device, comprising:

a plurality of electrical interface conductors;

an electrical ground conductor spaced apart from the plurality of electrical interface conductors; and a plurality of selectively conductive segments electrically coupled to the electrical ground conductor and being otherwise insulated from each other by insulative strips, each selectively conductive segment having at least one of the plurality of electrical interface conductors embedded therein;

wherein:

the electrical ground conductor is electrically isolated from the plurality of electrical interface conductors by the selectively conductive segments unless a voltage exceeding a predetermined threshold is applied across the electrical ground conductor and one of the plurality of the electrical interface conductors; and at least two of the plurality of selectively conductive segments have different compositions.

2. The electrical connector interface of claim 1, wherein the electrical ground conductor comprises a conductive ring disposed about the periphery of the electrical connector interface.

\* \* \* \* \*